(12) United States Patent
Lee et al.

(10) Patent No.: US 10,016,668 B2
(45) Date of Patent: Jul. 10, 2018

(54) MOBILE TERMINAL FOR CURLING ANALYSIS AND CURLING MATCH ANALYSIS SYSTEM USING THE SAME

(71) Applicant: Foundation of Soongsil University-Industry Cooperation, Seoul (KR)

(72) Inventors: Soowon Lee, Seoul (KR); Sung Geon Park, Seoul (KR); Sang Kwon Sim, Seoul (KR); Dongxu Jin, Ansan-si (KR); Jang Yun Um, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 326 days.

(21) Appl. No.: 14/892,941

(22) PCT Filed: Dec. 9, 2013

(86) PCT No.: PCT/KR2013/011340
§ 371 (c)(1),
(2) Date: Nov. 20, 2015

(87) PCT Pub. No.: WO2015/080325
PCT Pub. Date: Jun. 4, 2015

(65) Prior Publication Data
US 2016/0121187 A1    May 5, 2016

(30) Foreign Application Priority Data

Nov. 28, 2013 (KR) ........................ 10-2013-0146100

(51) Int. Cl.
*A63F 13/00* (2014.01)
*A63F 9/24* (2006.01)
(Continued)

(52) U.S. Cl.
CPC .............. *A63B 67/14* (2013.01); *G06F 17/18* (2013.01); *G06Q 50/10* (2013.01)

(58) Field of Classification Search
CPC .......... A63B 71/06; A63B 67/14; G06F 17/18
See application file for complete search history.

(56) References Cited

U.S. PATENT DOCUMENTS 5,412,188 A * 5/1995 Metz ...................... A63B 71/06
                                                          235/375
5,779,566 A * 7/1998 Wilens ................... A63B 69/36
                                                          473/131
(Continued)

FOREIGN PATENT DOCUMENTS

KR   10-2005-0110593 A   11/2005
KR      10-0739514 B1     7/2007
(Continued)

OTHER PUBLICATIONS

Sung Geon Park et al., "Curling analysis based on the possession of the last stone per end", Procedia Engineering, vol. 60, 2013, pp. 391-396.

*Primary Examiner* — Milap Shah
(74) *Attorney, Agent, or Firm* — Novick, Kim & Lee, PLLC; Sang Ho Lee

(57) ABSTRACT

A mobile terminal for displaying curling game information is provided. The mobile terminal includes a first screen configured to receive and display the curling game information, a second screen configured to display statistical information based on pre-stored statistical analysis information according to the curling game information which is input by a user, and a computing component coupled to both of the first screen and the second screen. When a first team and a second team are in a curling game, the pre-stored statistical analysis information include at least one of the followings delivery information as to which team delivers a (Continued)

first stone of each end of the curling game, score distribution information, delivery type information, performance information for each delivery, winning rate information for each team as to the each end of the curling game, and game record information.

6 Claims, 15 Drawing Sheets

(51) Int. Cl.
    *A63B 67/14*     (2006.01)
    *G06F 17/18*     (2006.01)
    *G06Q 50/10*     (2012.01)

(56) References Cited

U.S. PATENT DOCUMENTS

| | | | | |
|---|---|---|---|---|
| 6,041,266 | A * | 3/2000 | Nickerson | A63B 71/06 273/451 |
| 6,122,559 | A * | 9/2000 | Bohn | A63B 71/0669 434/247 |
| 6,148,242 | A * | 11/2000 | Descalzi | G06F 15/025 273/148 B |
| 6,603,711 | B2 * | 8/2003 | Calace | A63B 71/0605 368/10 |
| 6,795,638 | B1 * | 9/2004 | Skelley, Jr. | G11B 27/002 386/200 |
| 7,620,466 | B2 * | 11/2009 | Neale | G07F 17/3232 700/91 |
| 2002/0016209 | A1 * | 2/2002 | Bates | A63B 71/0672 473/55 |
| 2002/0049507 | A1 * | 4/2002 | Hameen-Anttila | H04N 21/25808 700/92 |
| 2003/0204275 | A1 * | 10/2003 | Krubeck | A63B 71/06 700/91 |
| 2006/0267286 | A1 * | 11/2006 | Hickey | A63B 67/06 273/317 |
| 2007/0265719 | A1 * | 11/2007 | Harding | A63B 71/06 700/92 |
| 2007/0300157 | A1 * | 12/2007 | Clausi | G06F 3/04883 715/719 |
| 2009/0096593 | A1 * | 4/2009 | Dakers | A63B 71/0686 340/323 R |
| 2010/0048187 | A1 * | 2/2010 | Sullivan | H04N 21/2187 455/414.3 |
| 2010/0211198 | A1 * | 8/2010 | Ressler | G06Q 10/00 700/91 |
| 2012/0064956 | A1 * | 3/2012 | Das | A63B 71/0616 463/7 |
| 2014/0288683 | A1 * | 9/2014 | Sullivan | H04N 21/2187 700/92 |

FOREIGN PATENT DOCUMENTS

| | | |
|---|---|---|
| KR | 10-2009-0102550 A | 9/2009 |
| KR | 10-2009-0118634 A | 11/2009 |
| KR | 10-2010-0062056 A | 6/2010 |
| KR | 10-2011-0046261 A | 5/2011 |
| KR | 10-2012-0077538 A | 7/2012 |
| KR | 10-2013-0113546 A | 10/2013 |

* cited by examiner

| No. | Country name | Number of games | Win | Lose | Win rate (%) | Group |
|---|---|---|---|---|---|---|
| 1 | Canada | 241 | 191 | 59 | 79.25 | High level |
| 2 | Sweden | 210 | 136 | 74 | 64.76 | |
| 3 | Norway | 181 | 107 | 74 | 59.12 | |
| 4 | Scotland | 210 | 121 | 89 | 57.62 | |
| 5 | USA | 217 | 113 | 104 | 52.07 | Intermediate level |
| 6 | Switzerland | 204 | 105 | 99 | 51.47 | |
| 7 | China | 138 | 71 | 67 | 51.45 | |
| 8 | Germany | 179 | 84 | 95 | 46.93 | |
| 9 | Denmark | 205 | 91 | 114 | 44.39 | Low level |
| 10 | Russia | 75 | 33 | 42 | 44.00 | |
| 11 | New Zealand | 30 | 13 | 17 | 43.33 | |
| 12 | France | 72 | 30 | 42 | 41.67 | |
| 13 | Finland | 69 | 25 | 44 | 36.23 | |
| 14 | Australia | 38 | 12 | 26 | 31.58 | |
| 15 | Japan | 94 | 29 | 65 | 30.85 | |
| 16 | Republic of Korea | 62 | 17 | 45 | 27.42 | |
| 17 | Czech Republic | 78 | 15 | 63 | 19.23 | |
| 18 | Italy | 97 | 23 | 74 | 23.71 | |
| 19 | Libya | 10 | 1 | 9 | 10.00 | |
| 20 | Latvia | 11 | 1 | 10 | 9.09 | |
| 21 | Netherlands | 11 | 0 | 11 | 0.00 | |

\* Countries having a win rate of 5.5 or more are classified into a high level group, countries having a win rate of 4.5 to 5.5 are classified into an intermediate level group, and countries having a win rate of 4.5 or less are classified into a low level group

FIG. 2

|  | End | | | | | | | | | | Total |
|---|---|---|---|---|---|---|---|---|---|---|---|
|  | 1 | 2 | 3 | 4 | 5 | 6 | 7 | 8 | 9 | 10 | |
| # of games with first stone (A) | 309 | 313 | 331 | 327 | 348 | 330 | 326 | 335 | 370 | 240 | 3,229 |
| # of games with last stone (B) | 319 | 315 | 297 | 301 | 280 | 298 | 302 | 293 | 258 | 388 | 3,051 |
| Total # of games (A+B) | 628 | 628 | 628 | 628 | 628 | 628 | 628 | 628 | 628 | 628 | 6,280 |
| AvgScore with first stone (C) | 0.201 | 0.220 | 0.287 | 0.352 | 0.313 | 0.312 | 0.298 | 0.451 | 0.251 | 1.138 | 3.826 |
| AvgScore with last stone (D) | 0.875 | 1.067 | 1.219 | 1.213 | 1.214 | 1.258 | 1.281 | 1.276 | 0.875 | 0.875 | 11.545 |
| AvgScore with per end (A*B+C*D/A+B) | 0.545 | 0.645 | 0.728 | 0.764 | 0.715 | 0.761 | 0.771 | 0.545 | 0.545 | 0.545 | 7.486 |
| AvgScore Difference (D-C) | 0.671 | 0.846 | 0.932 | 0.861 | 0.901 | 0.946 | 0.984 | 0.671 | 0.671 | 0.671 | 7.719 |

|  | End | | | | | | | | | | Total |
|---|---|---|---|---|---|---|---|---|---|---|---|
|  | 1 | 2 | 3 | 4 | 5 | 6 | 7 | 8 | 9 | 10 | |
| Number A of games in which a first throw is performed in end | 309 | 313 | 331 | 327 | 348 | 330 | 326 | 335 | 370 | 240 | 3229 |
| Number B of games in which a second throw is performed in end | 319 | 315 | 297 | 301 | 280 | 298 | 302 | 293 | 258 | 388 | 3051 |
| Total (A+B) | 628 | 628 | 628 | 628 | 628 | 628 | 628 | 628 | 628 | 628 | 6280 |
| Average score (C) in end when a first throw is performed in end | 0.2039 | 0.2204 | 0.2870 | 0.3517 | 0.3132 | 0.3121 | 0.2975 | 0.4507 | 0.2514 | 1.1375 | 3.8255 |
| Average score (D) in end when a second throw is performed in end | 0.8746 | 1.0667 | 1.2189 | 1.2126 | 1.2143 | 1.2584 | 1.2815 | 1.2765 | 0.8915 | 1.2500 | 11.5448 |
| Average score (A∗C+B∗D)/(A+B) in end | 0.5446 | 0.6449 | 0.7277 | 0.7643 | 0.7150 | 0.7611 | 0.7707 | 0.8360 | 0.5143 | 1.2070 | 7.4857 |
| Average acquired and lost score difference (E) in end when a first throw is performed in end | -0.5631 | -0.7157 | -0.6737 | -0.5535 | -0.5920 | -0.6636 | -0.8074 | -0.3731 | -0.8378 | 0.9500 | -4.6299 |
| Average acquired and lost score difference (F) in end when a second throw is performed in end | 0.7335 | 0.8952 | 1.0505 | 1.0033 | 1.0286 | 1.0738 | 1.1225 | 1.1399 | 0.5853 | 1.1031 | 9.7358 |
| Average acquired and lost score difference (A∗E+B∗F)/(A+B) in end | 0.0955 | 0.0924 | 0.1417 | 0.1927 | 0.1306 | 0.1608 | 0.2245 | 0.3328 | 0.2532 | 1.0446 | 2.1624 |
| Average cumulative score difference (G) to end when a first throw is performed in end | -0.5631 | 0.3770 | -0.2659 | 0.6391 | 0.6897 | 0.7667 | 0.9110 | 1.2537 | 1.1297 | 2.6917 | – |
| Average cumulative score difference (H) to end when a second throw is performed in end | 0.7335 | 0.000 | 0.4007 | 0.3953 | 0.6071 | 0.8658 | 1.1755 | 1.5051 | 1.1008 | 1.8402 | – |
| Average cumulative score difference (A∗E+B∗F)/(A+B) to end | 0.0995 | 0.1879 | 0.3296 | 0.5233 | 0.6529 | 0.8137 | 1.0382 | 1.3710 | 1.1178 | 2.1624 | – |

| | Germany | USA | Sweden | Switzerland | Scotland | England | Japan | China | Canada | South Korea |
|---|---|---|---|---|---|---|---|---|---|---|
| Germany | – | 19-23 | 30-13 | 20-50 | 23-35 | 11-32 | 43-15 | 34-13 | 11-32 | 5-0 |
| USA | 23-35 | – | 12-32 | 11-32 | 43-15 | 11-32 | 9-40 | 23-35 | 12-32 | 9-40 |
| Sweden | 23-35 | 23-35 | – | 19-23 | 43-20 | 23-35 | 12-32 | 20-13 | 19-23 | 23-35 |
| Switzerland | 12-32 | 20-13 | 23-35 | – | 12-32 | 43-15 | 34-13 | 11-32 | 9-40 | 23-35 |
| Scotland | 11-32 | 19-23 | 23-35 | 23-35 | – | 11-32 | 43-15 | 34-13 | 11-32 | 12-32 |
| England | 43-15 | 20-34 | 12-32 | 23-35 | 23-35 | – | 30-45 | 50-25 | 23-35 | 43-15 |
| Japan | 34-13 | 14-43 | 11-32 | 12-32 | 20-13 | 12-32 | – | 43-15 | 34-13 | 0-3 |
| China | 11-32 | 23-35 | 43-15 | 11-32 | 19-23 | 23-35 | 12-32 | – | 43-15 | 12-33 |
| Canada | 9-40 | 12-32 | 34-13 | 43-15 | 3-45 | 12-32 | 23-35 | 12-32 | – | 11-32 |
| South Korea | 23-35 | 20-13 | 11-32 | 34-13 | 20-13 | 11-32 | 12-32 | 23-35 | 23-35 | – |

FIG. 6F

MOBILE TERMINAL FOR CURLING ANALYSIS AND CURLING MATCH ANALYSIS SYSTEM USING THE SAME

CROSS-REFERENCE TO RELATED APPLICATIONS

This application is a national-stage application under 35 U.S.C. § 371 of PCT/KR2013/011340 filed on Dec. 9, 2013, and claims priority to and the benefit of Korean Patent Application No. 10-2013-0146100, filed on Nov. 28, 2013, the disclosures of which are hereby incorporated by reference in their entirety.

BACKGROUND

1. Field of the Invention

The present invention relates to a mobile terminal for curling analysis and a curling game analysis system using the same capable of recording and analyzing data of a curling game.

2. Discussion of Related Art

Curling refers to a game in which a flat stone is slid on ice by a broom (a comb-like object) to be placed within a target so as to acquire a score. The game was begun in Scotland and has been actively conducted since the 16th century. An early stone was a large stone with a hole for a finger. However, in the 1800s, iron was used in place of the stone. The iron of 100 lb (45.4 kg) or more was been used. In 1838, Grand Caledonian curling Club was established in Scotland, and was the basis of merging into the International Curling Club.

In a curling game system, there are two teams each including four players. In a rink having a length of 42.1 m and a width of 4.3 m, a team and an opposing team alternately slide two stones toward a target inside a circle called a house, and acquire a score based on a degree of proximity of the stone to the target. The stone has a weight of 20 kg or less, a circumference of 91.4 cm or less, and a height of 11.4 cm. One game includes 10 ends or 12 ends, one end includes 16 times, and winning or losing is determined based on a score.

SUMMARY OF THE INVENTION

An aspect of the present invention provides a mobile terminal for curling analysis capable of recording and analyzing curling data in real time, and a curling match analysis system using the mobile terminal.

Therefore, in a mobile terminal according to an exemplary embodiment of the present invention, a curling match information input screen includes a match information input section, and a statistical information confirmation section in which previously stored statistical analysis information is confirmable according to match information input to the match information input section, and the statistical analysis information includes at least one of first and second throw acquisition information, score distribution information, shot type information, performance information for each shot, win rate information for each team and each end, match record information, and winning and losing probability information.

The match information input section may include a stone position input section in which coordinate information is acquired in a manner that a stone used in a curling match is touched and dragged to an arbitrary region.

In the match information input section, all position information of the stones may be recordable for each end and each team, and the position information of the stones may accumulated.

A curling match analysis system according to an exemplary embodiment of the present invention includes a mobile terminal in which an application for curling data analysis is installed and through which curling match information is inputable, and a curling match analysis server including a curling data collection unit that collects the match information input through the mobile terminal, a curling data analysis unit that performs match analysis and operation analysis using curling data collected by the curling data collection unit, a curling data storage unit which pre-stores curling statistical analysis information so statistical analysis is performable by the curling data analysis unit using the curling data, a curling data output unit which outputs information analyzed by the curling data analysis unit so the information is displayable in the mobile terminal, and a curling analysis control unit which performs control so match analysis or operation analysis is performable using the curling match information when the curling match information is input through the mobile terminal.

The curling data collection unit may collect both the match information input through the mobile terminal, and match information obtained over the Internet using a web crawling scheme.

The curling data analysis unit may analyze winning or losing factors according to a gender and a team level, winning or losing factors according to attack and defense factors, basic formation for winning through pattern analysis of first and second throws, basic formation of a first or second throw team according to end periods of time, and basic formation when the team is winning or losing using both of the match information input through the mobile terminal and the match information collected over the Internet.

The mobile terminal may output a match information input screen, and the match information input screen may be displayed with a match information input section and a statistical information confirmation section.

The statistical information confirmation section may be prepared so that statistical analysis information is confirmable, and the statistical analysis information may include at least one of first and second throw acquisition information, score distribution information, shot type information, performance information for each shot, win rate information for each team and each end, match record information, and winning and losing probability information.

The match information input section may include a stone position input section in which coordinate information is acquired in a manner that a stone used in a curling match is touched and dragged to an arbitrary region.

In the match information input section, all position information of the stones may be provided be recordable for each end and each team, and the position information of the stones may be accumulated.

According to an aspect of the present invention described above, it is possible to input and analyze curling data in real time, and to confirm probability analysis information required for a curling match.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 is a table illustrating an analysis method of a curling data analysis unit in the curling game analysis system according to an exemplary embodiment of the present invention;

FIG. 4 is a diagram illustrating curling statistical analysis information stored in a curling data storage unit in the curling game analysis system according to an exemplary embodiment of the present invention;

FIG. 5 is a diagram illustrating a screen on which a curling analysis application of a mobile terminal according to an exemplary embodiment of the present invention is executed;

FIGS. 6A to 6F are diagrams illustrating that the statistical analysis information is output on the screen on which the curling analysis application of the mobile terminal of FIG. 5 is executed.

DETAILED DESCRIPTION OF EXEMPLARY EMBODIMENTS

Figure 1:
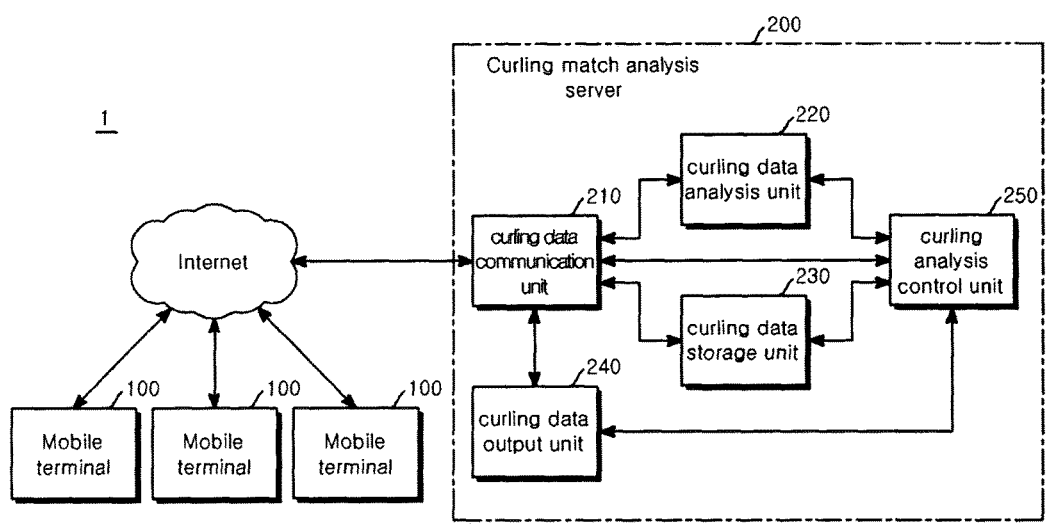
FIG. 1 is a brief block diagram of a curling game analysis system according to an exemplary embodiment of the present invention.

Hereinafter, exemplary embodiments of the present invention will be described in detail with reference to the accompanying drawings. When components are denoted with reference numerals in the drawings, the same components are denoted with the same reference numerals even when the components are shown in different drawings.

FIG. 1 is a brief block diagram of a curling game analysis system according to an exemplary embodiment of the present invention.

The curling game analysis system 1 may include a mobile terminal 100 and a curling game analysis server 200.

In the mobile terminal 100, a computer application for curling data analysis may be installed. The computer application for curling data analysis may include an interface screen for recording or receiving curling game information and any information as to a curling competition. A user may input the curling game information such as team information or tournament information in a screen of the mobile terminal 100 and analyze the curling game with a help of the curling game analysis server 200.

The curling game analysis server 200 may include a curling data communication unit 210, a curling data analysis unit 220, a curling data storage unit 230, a curling data output unit 240, and a curling analysis control unit 250.

The curling data communication unit 210 may collect and receive data of past curling games, and may be configured to receive the curling data using a web crawling scheme. The curling data may include basic statistical information using strategy analysis, such as a team registration status, a team query status, tournament information, a tournament result, the number of curling games, a tournament name, year of tournament, a country name, and an average score for each end provided by such as Korea Curling Federation, World Curling Federation, or the like.

The curling data communication unit 210 may collect or receive the curling data that is input through the mobile terminal 100. The curling data input through the mobile terminal 100 may include delivery information for each situation, result values, and the like.

The curling data analysis unit 220 may perform game analysis and operation analysis using the curling data collected by the curling data communication unit 210. The curling data analysis unit 220 may perform the game analysis using the collected game data. The curling data analysis unit 220 may analyze analysis requirements of curling specialists and the collected past game data using a Delphi scheme to derive performance determinants. The Delphi scheme is one qualitative prediction method of predicting the future, and refers to a method of repeatedly collecting, exchanging, and developing opinions of several specialists to predict the future. This scheme, developed by RAND Corporation in US in 1948 and used in several fields such as military, education, research and development, and information processing, is a well-known technology used for future prediction in various fields.

Using the collected big data, the curling data analysis unit 220 may analyze winning or losing factors according to a gender and a level of skill set for each team, winning or losing factors according to attack and defense factors, basic formation for winning through pattern analysis of a first delivery and a second delivery for each team, basic formation of a first delivery and a second delivery for each team per each end of a curling game (an opening part, an intermediate part, and a latter part), basic formation when the team is winning or losing, or the like.

The curling data analysis unit 220 may analyze curling data using a previously stored operation analysis model. The operation analysis model is a hybrid approach analysis scheme of acquiring knowledge of a strategy and an operation from curling specialists, and supplementing the acquired knowledge through analysis of the collected game data (for example, delivery information for each situation or result value). Therefore, the curling data analysis unit 220 may collect information on the strategy and the operation according to a specific situation from the curling specialists and convert the information into knowledge using a (rule-based) representation method that can be understood by a computer. Further, the curling data analysis unit 220 automatically derives operation rules from the collected game data (for example, the delivery information for each situation or a winning rate) using a mining technology utilized in big data analysis such as classification, associated rules, or regression analysis. The operation rules are verified by specialists and supplemented information can be utilized.

Table 1 below is an example of strategies held by a curling specialist, and relevant information may be stored in the curling data storage unit 230 in advance.

TABLE 1

Strategy 1. A first delivery team performs an operation for preventing a center of a house from being given to the second delivery team, and the second delivery team performs TABLE 1-continued an operation of obstructing a scoring of the opposing team in order to maintain a current state if the second delivery team attempts to score two or more points in the end or has a current score higher than that of the opposing team.
Strategy 2. An opening part of the game (Ends 1 to 3) is a step of recognizing a strategy of the opposing team while analyzing a state of the ice. An operation of acquiring a high score and having an initiative of the game may also be performed in the opening part of the game. In particular, it is important in the game whether a delivery is the first delivery or the second delivery of one end.
Strategy 3. In an intermediate part (Ends 4 to 6), a skip should recognize a situation of the entire game and determine whether to perform an aggressive operation or a defensive operation. In this period of time, information on whether the score is higher or lower than that of the opposing team is most important.
Strategy 4. A latter part (Ends 7 to 9) of the game is an important step in which winning or losing of the game is determined. In this step, a situation regarding whether the score is higher or lower and information on a score difference are very important, as in the mid-game.
Strategy 5. Since a curling team includes four players and one player can use two stones in each end, each team can deliver eight stones in each end. Therefore, a different operation and strategy may be used according to the number of remaining stones.

The curling data analysis unit 220 may analyze the big data using statistical information in which operations performed according to several situations are divided according to gender, first and second deliveries, ends, the number of remaining stones, positions, and skills, and accordingly, analyze winning and losing factors.

The curling data analysis unit 220 may classify respective teams into a high level group, a middle level group, and a low level group according to a winning rate (a number of won games/a total number of participation games) of countries based on data collected in past games, and perform analysis according to the team level, as illustrated in FIG. 2.

The curling data analysis unit 220 may analyze information on first and second deliveries of the team, an average score, an average difference between an acquired point and a lost point, and an average cumulative score difference, and perform the game analysis according to a result of the analysis as follows.

A case in which the curling data analysis unit 220 performs the game analysis or the operation analysis according to statistical analysis data will be described with reference to FIGS. 3A to 3D.

Figures 3A, 3B:
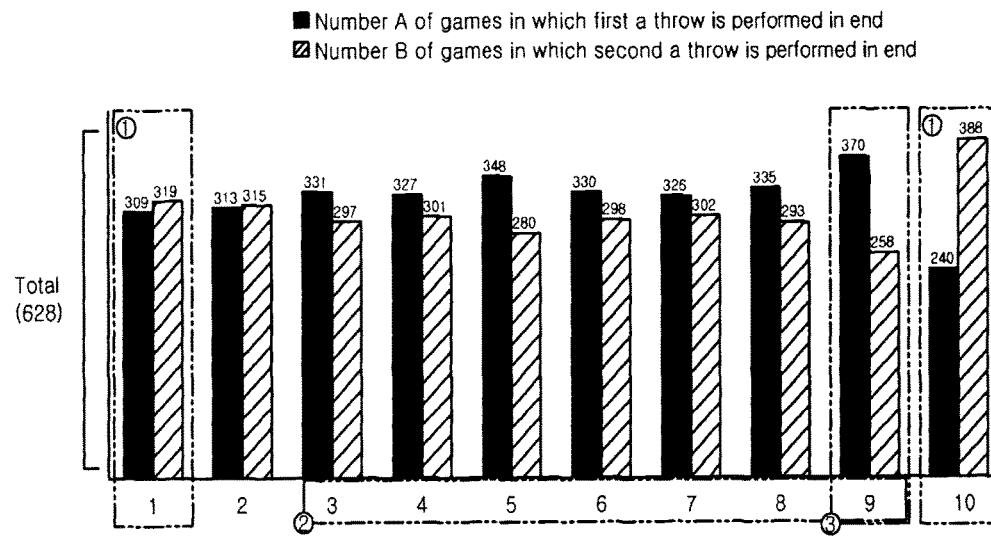
FIGS. 3A to 3D are diagrams illustrating that the curling data analysis unit in the curling game analysis system according to an exemplary embodiment of the present invention performs game analysis or operation analysis based on statistical analysis data.

Referring to FIGS. 3A and 3B, the following analysis is obtained.

① A team that has won in the game was found to have performed more games through the second delivery rather than the first delivery in Ends 1 and 10.

② The team that has won in the game was found to have performed more games through the first delivery rather than the second delivery in Ends 3 to 9.

③ The number of games with the first delivery in End 9 was found to be greatest compared to the numbers of games with the first delivery in other ends.

Figure 3C:
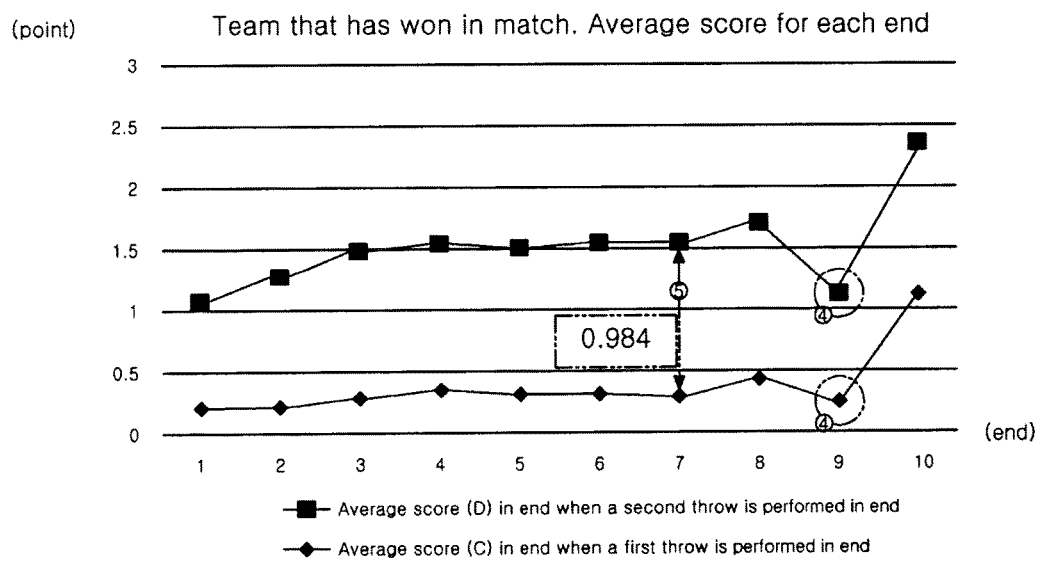

Referring to FIG. 3C, the analysis is as follows.

④ The average score was found to have continuously increased after the game started, decreased in End 9, and then, suddenly increased in End 10 again.

⑤ When an average score difference between the second delivery and the first delivery in End 7 is obtained (D-C), the average score difference is greatest (0.984 points) compared to average score differences in other ends.

Figure 3D:
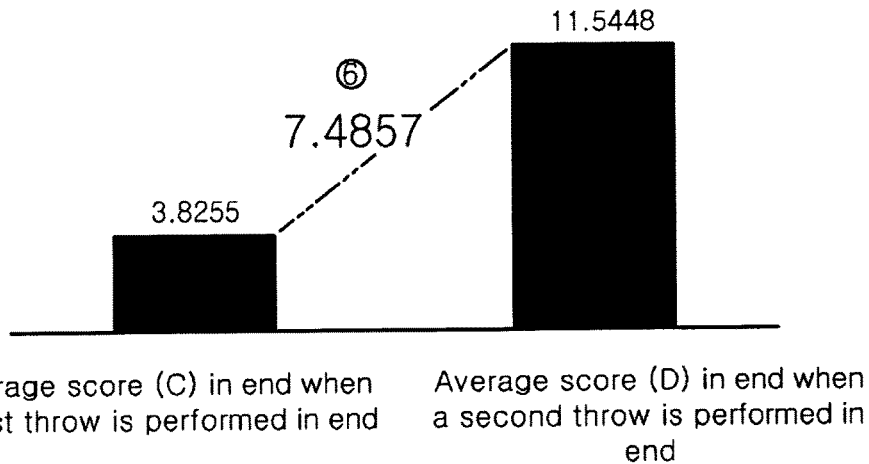

Referring to FIG. 3D, the analysis is as follows.

⑥ When average scores in the first delivery and the second delivery of the team that won in the game are compared with each other, the average score in the second delivery appeared to be higher by about 7.5 points (7.4857 points).

The curling data analysis unit 220 can derive the following final analysis based on the analysis ① to analysis ⑥ as described above.

1. In the curling game, the second delivery team in ends 1 and 10 is likely to win.

2. It may be predicted that acquired points would be higher than lost points in each end from the fact that the team that has won in the game utilized the first delivery rather than the second delivery in ends 3 to 9.

3. The number of games of the first delivery in end 9 is greatest compared to the numbers of games in other ends. This is intended to acquire the second delivery in the final end (End 10).

4. When an average score difference between the first and second deliveries in end 7 is obtained (D-C), the average score difference was found to be greatest (0.984 points) compared to average score differences in other ends.

The curling data storage unit 230 may pre-store the curling statistical analysis information. The curling statistical analysis information stored in the curling data storage unit 230 may be provided to the curling data analysis unit 220 and used for game analysis and operation analysis. FIG. 4 illustrates an example of the curling statistical analysis information stored in the curling data storage unit 230.

The curling data output unit 240 may output the information analyzed by the curling data analysis unit 220. When outputting the information, the curling data output unit 240 may output the information on the screen of the mobile terminal 100.

The curling analysis control unit 250 may perform overall control of the curling game analysis server 200. When the curling analysis control unit 250 receives the curling game information via the interface of the mobile terminal 100, the curling analysis control unit 250 analyzes and processes the information and performs control such that the game analysis and the operation analysis can be performed.

Figure 5:
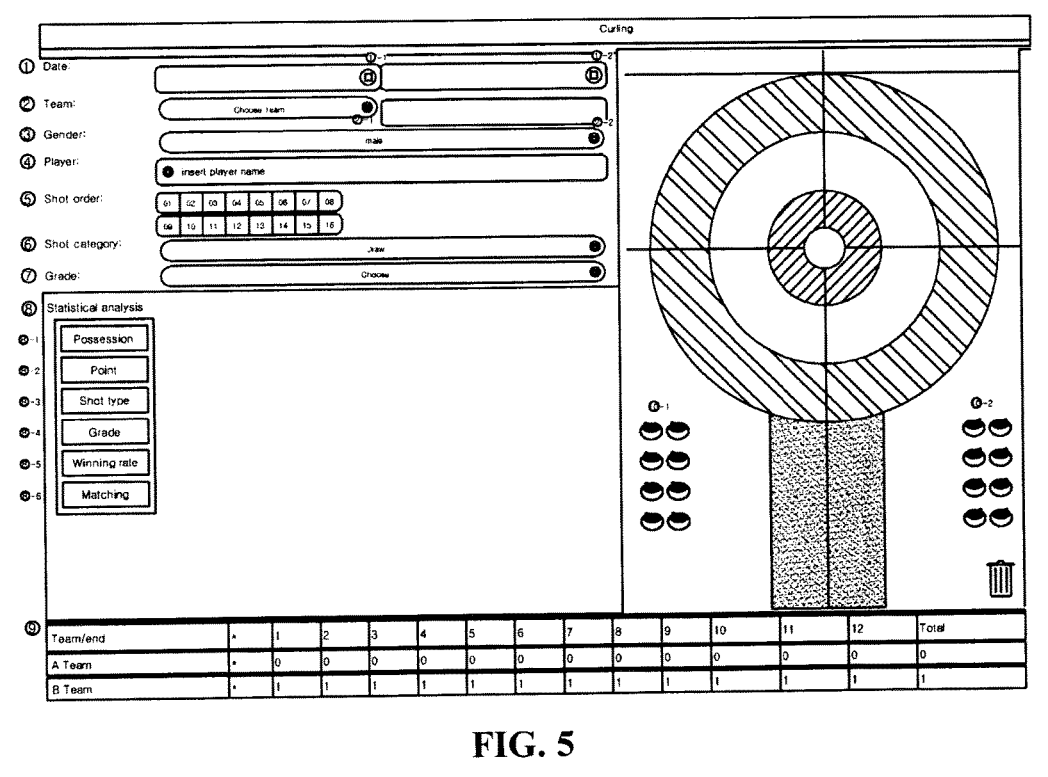

FIG. 5 is a diagram illustrating a screen on which a curling analysis application of a mobile terminal according to an exemplary embodiment of the present invention is executed.

The mobile terminal 100, in a state in which the curling analysis application has been installed, may output the game information input screen as illustrated in FIG. 6. On the game information input screen, a game information input section in which curling game information can be input, and a statistical information confirmation section in which statistical information can be confirmed may be displayed.

The game information input section may include a game date input section (①), a game team input section (②), a gender input section (③), an entry input section (④), a delivery order input section (⑤), a delivery category input section (⑥), a delivery accuracy input section (⑦), a game score sheet input section (⑨), and a section ⑩ in which a final position of the stone around a house (a region consisting of three circles being 4, 8, and 12 feet from the center) in a curling stadium is input.

The statistical information confirmation section may include a statistical information confirmation section (⑧) in which statistics of game record information for an opposing team, statistics for predicting a probability of winning or losing in the game, and the like can be confirmed.

The date input section (①) is a region in which a game start date is input, and is divided into ①-1 and ①-2. When part ①-1 is clicked, a calendar is presented such that the game start date can be input. In part ①-2, the game start time can be selected.

The game team input section (②) is a region in which a team to perform the game is input. in ②-1, team A or B can be selected, and in ②-2, the user can directly input a team name.

The gender input section (③) is a region in which a gender (male/female) is input.

The entry input section (④) is a part in which a list of participating player names is input. In the curling game, one team includes four players, and positions include lead, second, third, and skip. The user directly inputs a name of a player to the corresponding position. When the game starts, a player in the lead position performs a delivery for determining the first delivery and the second delivery, and accordingly, it is very important to determine the players.

The delivery order input section (⑤) is a part in which an order of deliveries is input. In the curling game, four players can use two stones in one end, and a total number of stones used by players in both teams in one end is 16 (4 players×2 times×2 teams). Therefore, since it is important to set and recognize a situation of the end so as to analyze an operation and a strategy, information on an order of the stones is necessary. However, due to game characteristics that the first delivery and the second delivery in each end vary depending on a game result of a previous end, an odd number is input for a first delivery team, and an even number is input for a second delivery team.

The delivery category input section (⑥) is a part in which deliveries are classified and input. Since curling is a game using a collision force between a stone and a stone, a friction force between ice and the stone, or the like, the intention of the user can be recognized according to a type of delivery (a total of eleven deliveries including Draw, Front, Guard, Raise, Wick/Soft peeling, Freeze, Take-out, Hit & Roll, Clearing, Double Take-out, and Promotion Take-out). The types of deliveries defined by a group of specialists experienced in curling player life and leadership are used.

In the delivery accuracy input section (⑦), a scheme in which the user directly inputs a score in a 5-point scale in order to evaluate the accuracy of the delivery is adopted. The delivery accuracy may be used as an index for evaluating a skill of a player.

A statistical information confirmation section (⑧) is a part in which statistical information can be confirmed, and provides 1) first and second delivery acquisition (Possession), 2) score distribution (Point), 3) a type of delivery (Delivery type), 4) performance for each delivery (Grade), 5) a winning rate of each team and each end, 6) a game record (game), and 7) probability (Probability) information. A detailed configuration of will be described with reference to FIGS. 6A to 6F.

Figure 6A:
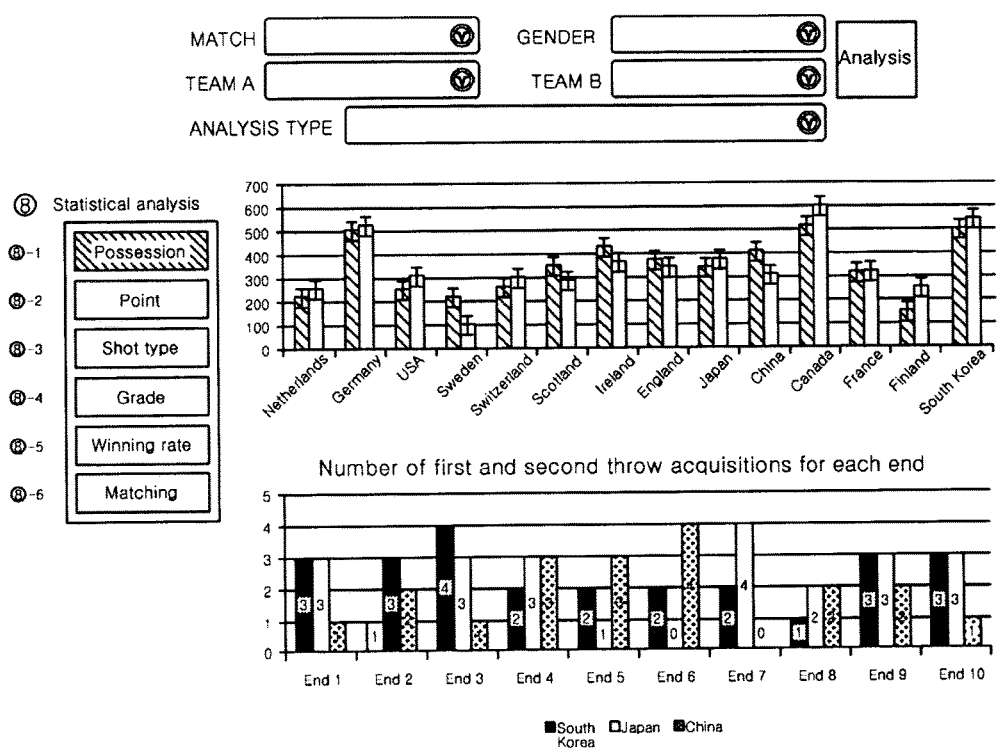

Referring to FIG. 6A, ⑧-1 is a category in which first or second delivery acquisition information is provided. The curling game is a winter sport in which among two teams, a team acquiring a higher score than that of the opposing team using a tool in a given time wins. The curling game has a characteristic that physical collision between a stone and a stone has direct influence on a game result. Therefore, an order of performing the game is very important. First use of the stone before the opposing team is defined as the first delivery, and use of the stone after the opposing team deliveries is defined as the second delivery. Category ⑧-1 presents whether each team (country) performs the first delivery or the second delivery in games of the team using a frequency distribution table or a bar graph so as to provide statistical information. When the user selects the type and number of games, a gender, a name of a team to be analyzed, and a type of analysis information in a determined search window and then presses an analysis button, the user can view information provided in category ⑧-1.

Figure 6B:
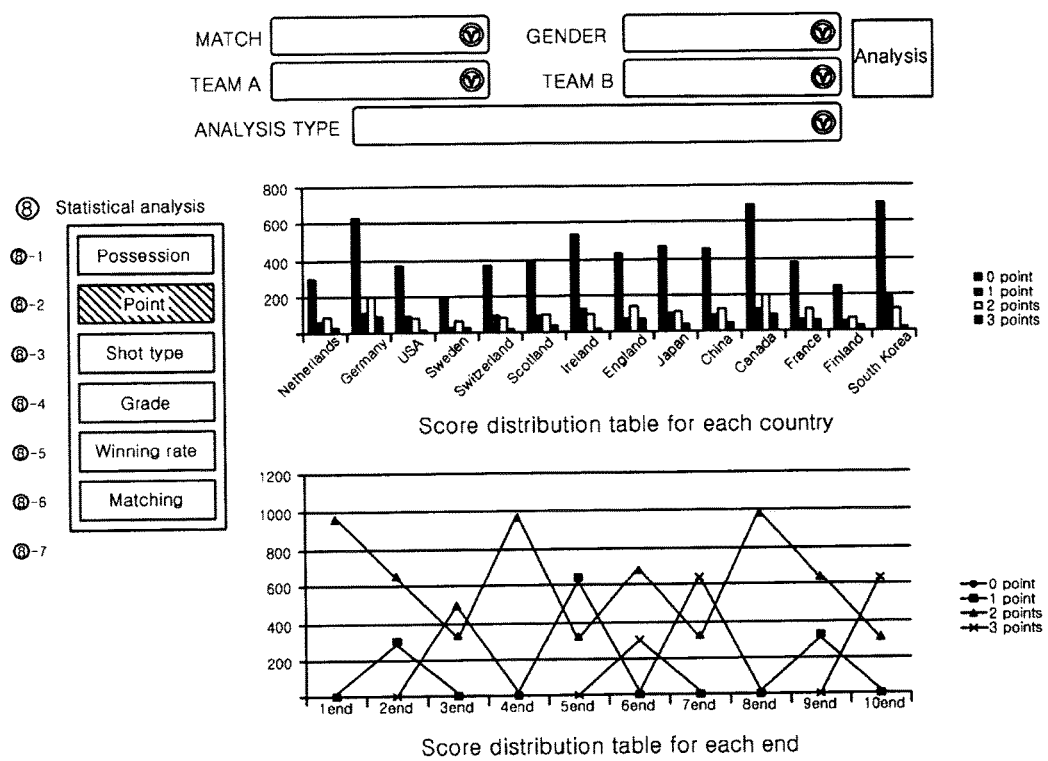

Referring to FIG. 6B, ⑧-2 is a category in which information on a score distribution of each team and each country is provided. Based on an average score (which is calculated in consideration of a league or a level of the team), the level of the team can be evaluated. Further, information on an average score distribution for each end is presented, and information for comparison of a scoring pattern of the team to be analyzed is provided.

Figure 6C:
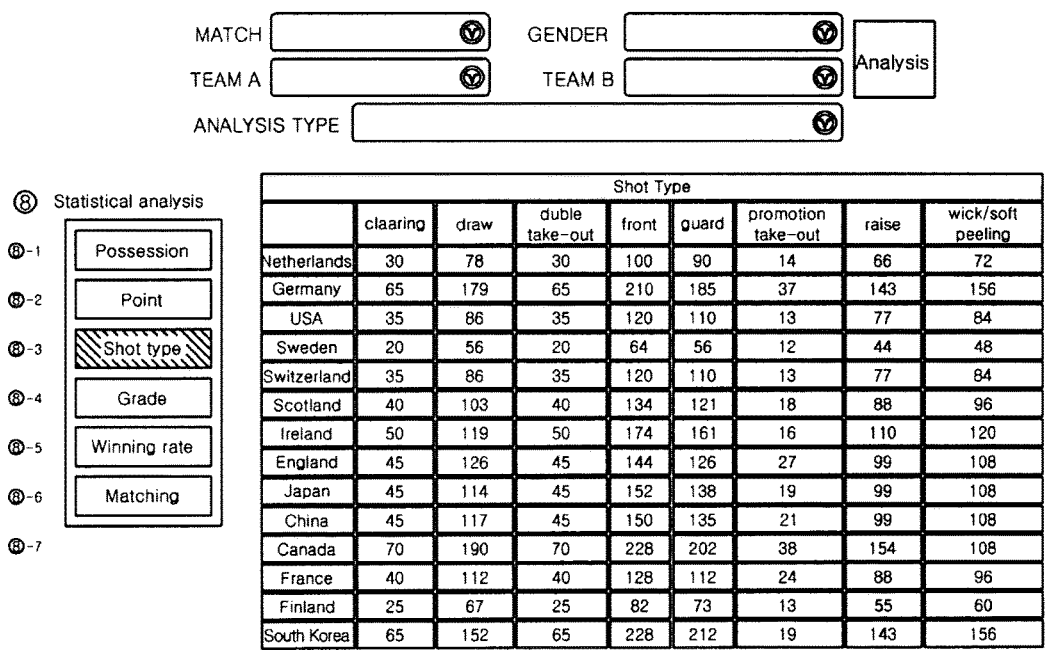

Referring to FIG. 6C, ⑧-3 is a category in which statistical information on the types of deliveries is provided. A variety of deliveries in curling may be used depending on a situation, and the type of delivery is a key element for recognizing an operation of the team and may be used as information. The illustrated figure presents a distribution of the types of deliveries used in games by countries participating in a national tournament through cross-analysis, which is stored in a database. Analysis information that may be presented is statistical information corresponding to technical statistics such as a frequency distribution table, a histogram, or a bar graph.

Figure 6D:
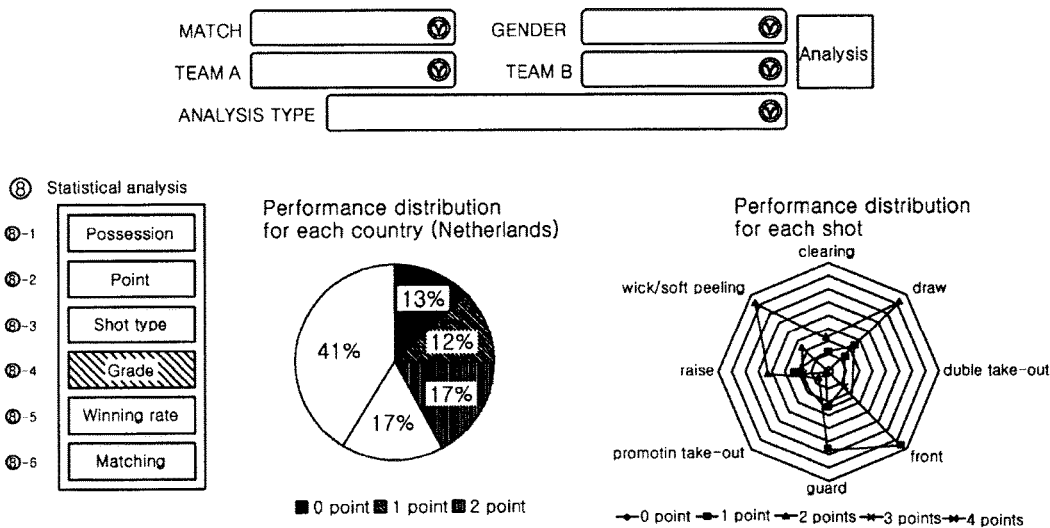
Figure 6E:
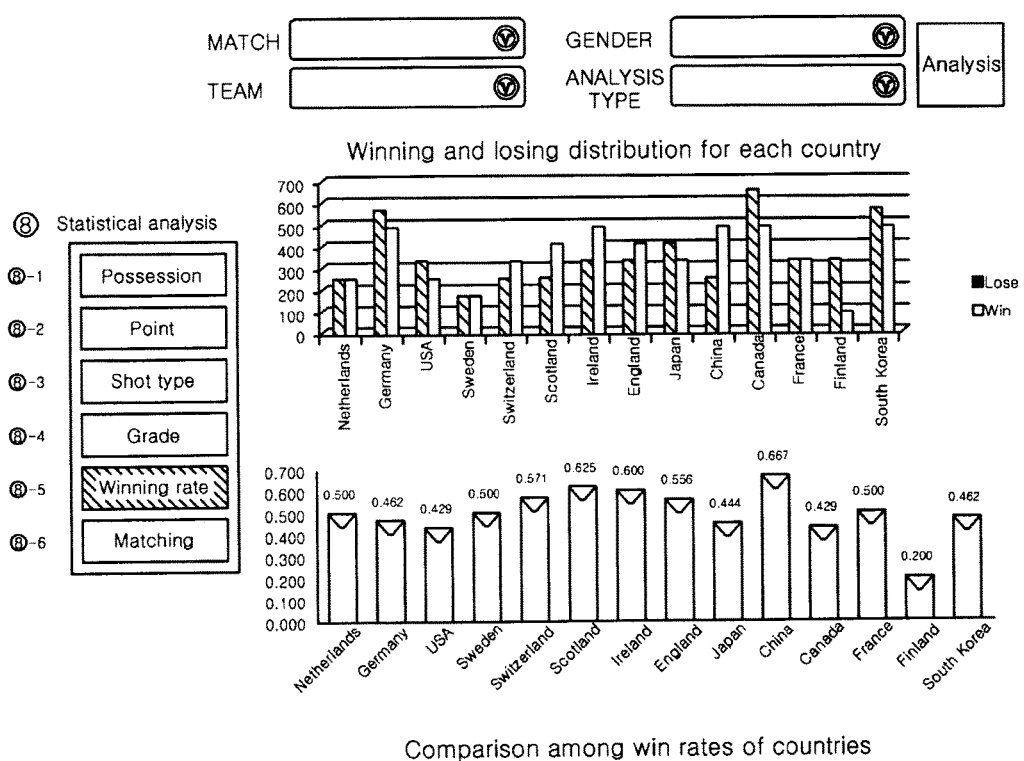
Figure 7A:
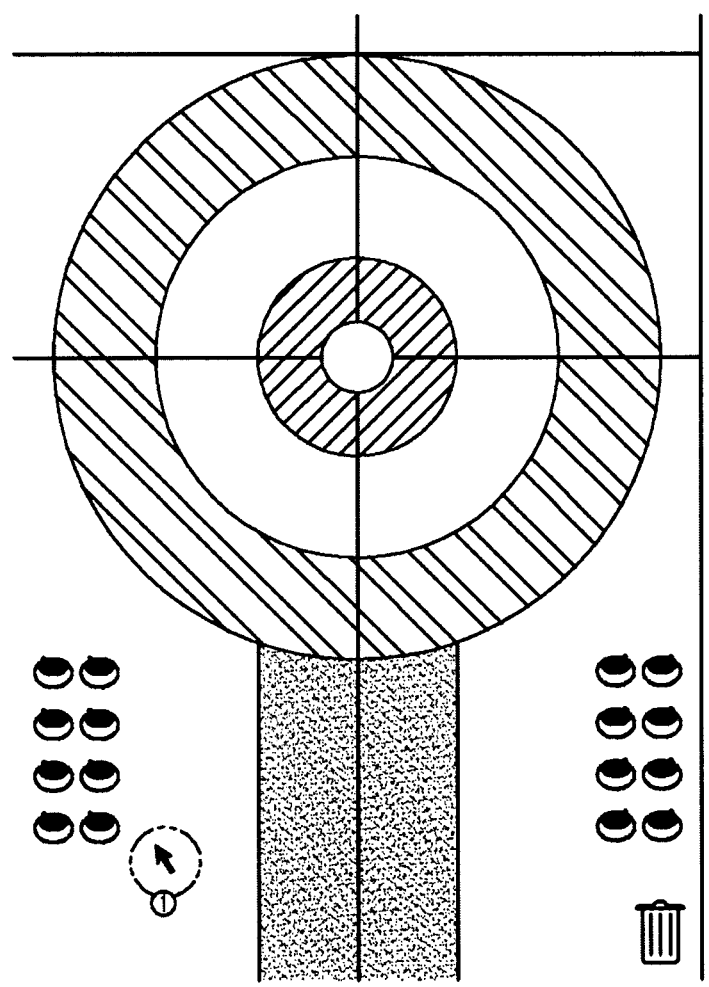
FIGS. 7A to 7D are diagrams illustrating a method of inputting information to a game information input section on the screen on which the curling analysis application of the mobile terminal of FIG. 5 is executed.
Figure 7B:
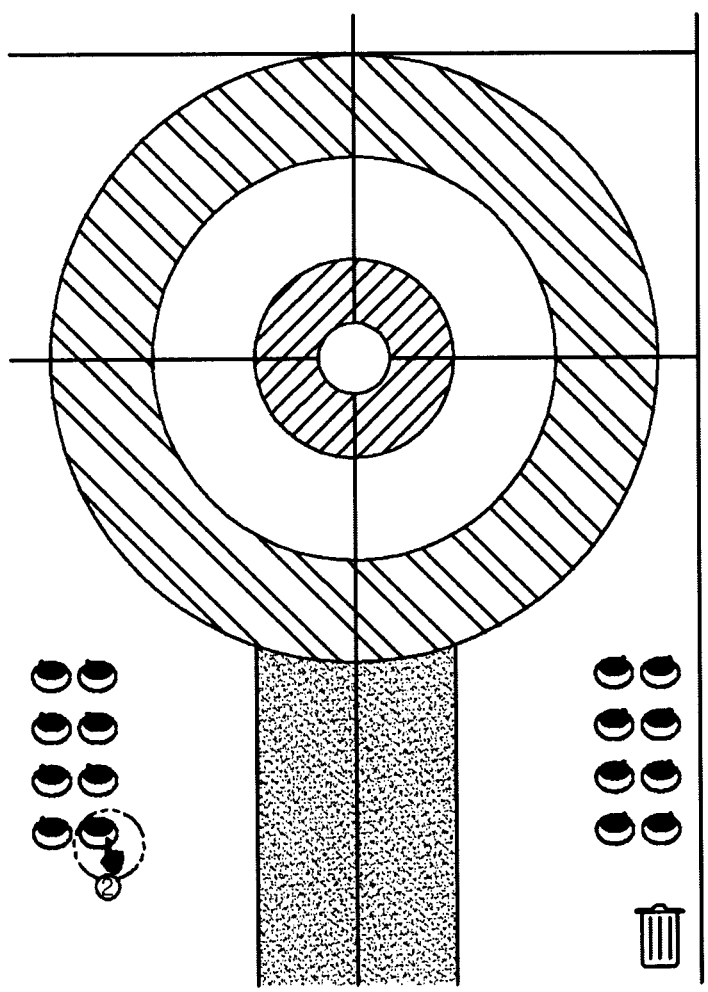
Figure 7C:
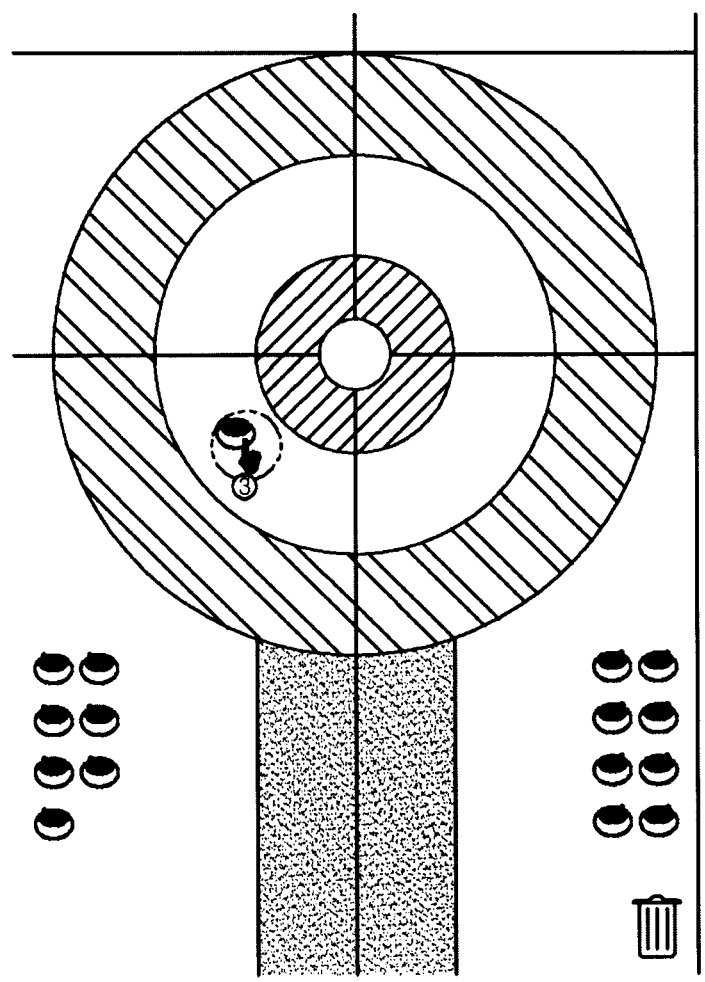
Figure 7D:
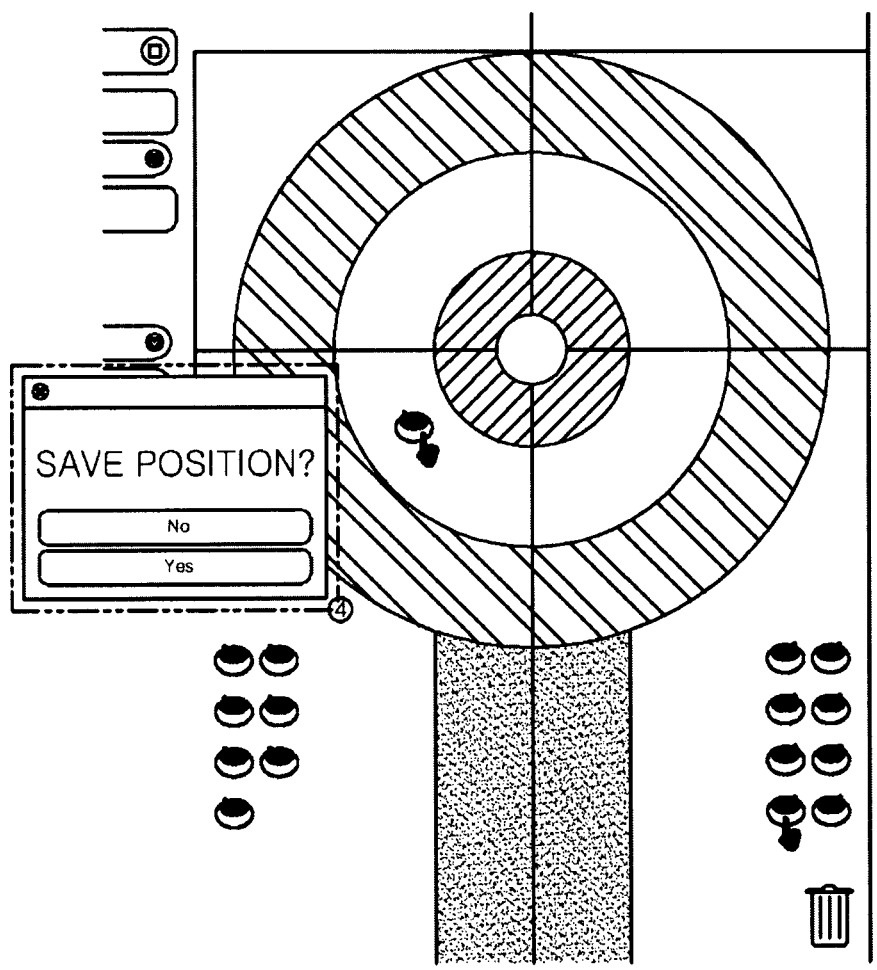

Referring to FIG. 6D, ⑧-4 is a category in which information on a performance for each delivery is provided. Accuracy of the delivery is a very important element when a leader of the team establishes an operation and a strategy. When the team has more players who receive operation instruction holding an ability to perform a delivery toward a planned place the team has high competitiveness. Therefore, the performance for deliveries is evaluated based on players and teams, and information expressed by, for example, a circular or radial diagram is provided to the user. Referring to FIG. 6E, ⑧-5 is a category in which information on a winning rate for each team and each end is provided. When the user selects the game, the gender, and the team to be searched for, selects the winning rate in an analysis type, and then presses the analysis button, winning rate information of the team desired by the user is provided.

Referring to FIG. 6F, ⑧-6 is a category in which data of past games with the opposing team is accumulated and game record information is provided. When the user selects game information, a gender, a team to be analyzed, and an analysis type, and then presses an analysis button, game record information desired by the user is provided.

A game score sheet input section (⑨) is a region in which a game score sheet is input. A team region is automatically input when region ② is input. A team having a team name with "*" in a next right region starts end 1 through the second delivery. Upper right numbers 1 to 12 in the sheet indicate ends 1 to 12. A regular game includes ends 1 to 10, and an overtime game includes ends 11 and 12. Total indicates a final score when the game ends.

A section ⑩ in which a final position of the stone around the house (a region consisting of three circles being 4, 8, and 12 feet from a center) in a curling stadium is input is a region in which the final position of the stone can be input around the house (a region consisting of three circles being 4, 8, and 12 feet from the center) in the curling stadium. When the user selects unique numbers 1 to 16 of the stones in part ⑤ and selects the final position of the stone, coordinate information of the position is input to the database, and the user can view only a UI of FIG. 3 rather than the coordinate information in ⑩. ⑩ includes a red stone ⑩-1, a blue stone ⑩-2, and ⑩-3 which is a deletion function of resetting a paint.

A method of using ⑩-1 and ⑩-2 will be described with reference to FIGS. 7A to 7D.

The user selects the stone displayed on the screen of the mobile terminal 100 using a hand or a touch pen (①). When the user selects the stone, an arrow icon is changed into a finger-like icon on the screen of the mobile terminal 100 (②). The user may drag the selected stone to a desired position (③). When the user drags the stone to the desired position, a pop-up window appears to query the user whether the user desires to designate the position. When the user selects "Yes," coordinate information of the position is stored. The accumulated coordinate information of the stone may be displayed. Accordingly, it is possible to confirm all coordinate information stored in the past and subsequent coordinate information changed due to collision with the other stone.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A curling game analysis system comprising:
   a mobile terminal having installed, in a memory device coupled to the mobile terminal, a computer application, the computer application executable to perform curling data analysis, the mobile terminal displaying an interface configured to receive curling game information input during a curling game, wherein the curling game comprises at least one player of at least one team of a plurality of teams physical moving at least one of a plurality of curling stones across a playing surface from a first team end toward a second team end; and
   a curling game analysis server coupled to the mobile terminal and comprising a processor configured to:
      collect the received curling game information transmitted from the mobile terminal during the curling game,
      store, cumulatively, in a memory device coupled to the processor, the collected curling game information;
      perform a game analysis and/or an operation analysis using the cumulatively collected and stored curling game information and automatically deriving game tactics therefrom using big data analysis mining technology;
      store curling statistical analysis information for a statistical analysis;
      conduct the statistical analysis based on the stored curling statistical analysis information and the cumulatively received and stored curling game information; and
      output the statistical analysis at the interface of the mobile terminal;
   wherein the interface of the mobile terminal displays a first section and a second section on a single display device, wherein the first section displays the received curling game information and the second section displays the statistical analysis,
   wherein, the curling statistical analysis information includes at least one of the following:
      delivery information as to which team delivers a first stone of each end of the curling game,
      score distribution information,
      delivery type information,
      performance information for each delivery,
      winning rate information for each team as to the each end of the curling game, and
      game record information, and
   wherein the statistical analysis includes the automatically derived game tactics.

2. The curling game analysis system of claim 1, wherein the processor is further configured to collect curling game information over a network using an internet connection and a web crawling scheme.

3. The curling game analysis system of claim 2, wherein the plurality of teams includes a first team and a second team, and wherein the processor is further configured to analyze at least one of: winning or losing factors according to a gender and a level of skills for each of the first team and the second team, or according to attack and defense factors for each of the first team and the second team, a first basic formation information for winning through pattern analysis of a first curling stone of each end of the curling game, a second basic formation information base on which team delivers a first stone of each end of the curling game, and a third basic formation information when each of the first team and the second team is winning or losing based on the curling game information obtained through either the mobile terminal or internet.

4. The curling game analysis system of claim 1, wherein the second section of the interface is further configured to receive stone position information in which coordinate information is acquired in a manner that a stone icon on the second section is touched and dragged from a first place to a second place by a user.

5. The curling game analysis system of claim 4, wherein the memory coupled to the processor cumulatively stores a plurality of the stone position information of the plurality of curling stones for the each end of the curling game and each team.

6. The curling data analysis system of claim 1, wherein the processor is further configured to perform big data analysis on the curling statistical information including gender, first and second deliveries, ends, the number of remaining stones, positions, and skills, and analyzes winning and losing factors and game tactics thereof.

* * * * *